Nov. 13, 1923.

T. W. BURKETT 1,474,141

CHAIN FASTENER

Filed Oct. 18, 1922

Inventor
Thomas W. Burkett

By Clarence A. O'Brien
Attorney

H. Bennen
H. A. LaClair
Witnesses

Nov. 13, 1923.  T. W. BURKETT  1,474,141
CHAIN FASTENER
Filed Oct. 18, 1922  2 Sheets-Sheet 2
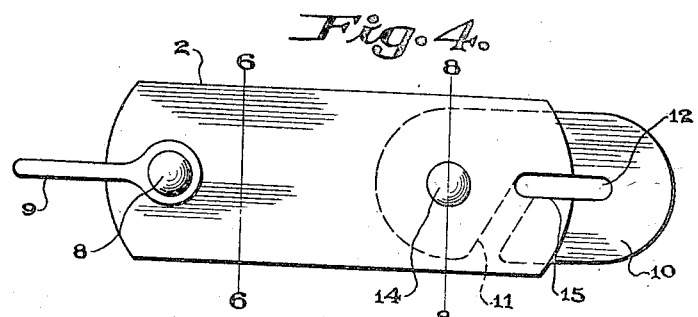
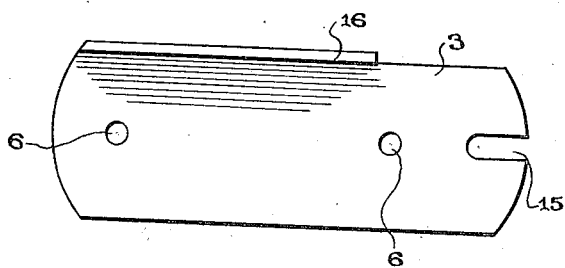 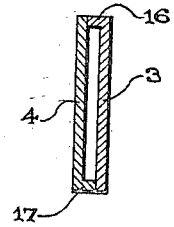
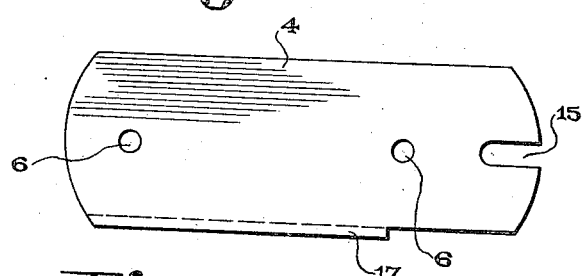 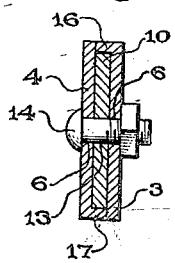
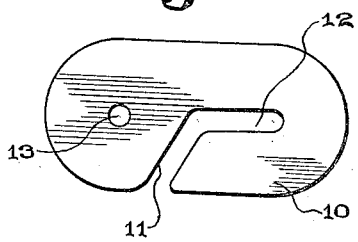 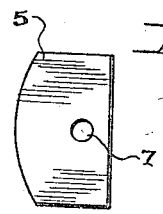
H. Berman
H. A. La Clair
Witnesses
Inventor
Thomas W. Burkett
By Clarence O'Brien
Attorney Patented Nov. 13, 1923.

1,474,141

UNITED STATES PATENT OFFICE.

THOMAS W. BURKETT, OF FALLS CREEK, PENNSYLVANIA, ASSIGNOR OF ONE-HALF TO PETER BURKETT, OF MAYPORT, PENNSYLVANIA.

CHAIN FASTENER.

Application filed October 18, 1922. Serial No. 595,388.

*To all whom it may concern:*

Be it known that I, THOMAS W. BURKETT, a citizen of the United States, residing at Falls Creek, in the county of Jefferson and State of Pennsylvania, have invented new and useful Improvements in Chain Fasteners, of which the following is a specification.

In carrying out the present invention it is my purpose to improve and simplify the general construction of fasteners for the side chains of anti-skid chains and to provide a fastener which will be positive and efficient in operation, so as to hold the ends of the side chains connected securely and to provide a side chain fastener which will embody comparatively few parts, and these so arranged and co-related as to reduce the possibility of derangement to a minimum, while at the same time permitting the fastener to be manipulated conveniently in order that the ends of the side chains may be quickly and securely connected together and easily released, as when it is desired to remove the anti-skid chains.

With the above recited objects in view and others of a similar nature, the invention resides in the construction, combination and arrangement of parts set forth in and falling within the scope of the appended claims.

In the accompanying drawings:

Figure 4 is an enlarged side elevation of the fastening device.

Figure 5 is an enlarged side elevation of one plate of the fastening device.

Figure 6 is a sectional view on the line 6—6 of Figure 4.

Figure 7 is a view similar to Figure 5 showing the other plate.

Figure 8 is a sectional view on the line 8—8 of Figure 4.

Figure 9 is a plan view of the securing link.

Figure 10 is a similar view of the spacer block.

Figure 1:
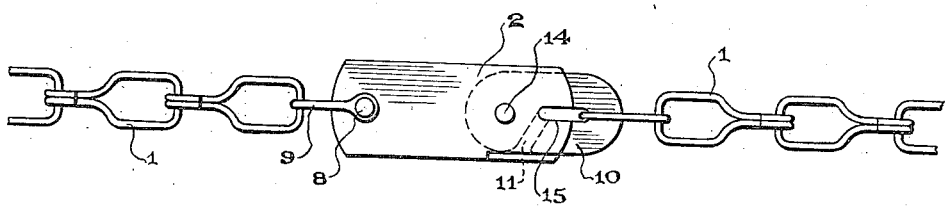
Figure 1 is a plan view showing my improved fastening device applied to the ends of the side chains, the securing link being shown in closed position.

Referring now to the drawings in detail, 1—1 designate the ends of the side chain to be fastened together, while 2 indicates my improved fastening device as an entirety. This fastening device 2 comprises companion side plates 3 and 4 substantially rectangular in plan and having the ends thereof preferably rounded, as shown in Figures 4, 5 and 7 of the drawings. These plates 3 and 4 are designed to be placed side by side, and when arranged side by side are held spaced apart by a spacing block 5 that is placed between the plates 3 and 4 at one end of the fastening device. This block 5 is very short in length as compared with the lengths of the plates 3 and 4, and the outer end thereof is rounded to correspond to the adjacent end of the plates 3 and 4, as clearly shown in Figure 10 of the drawings. The plates 3 and 4 are formed with openings 6, and when assembled the openings 6 aline with each other at the respective ends of the plates 3 and 4, while the openings at one end of the device aline with an opening 7 formed in the block 5. Through these alining openings 6 and 7 is passed a pivot pin 8, and connected with the pivot pin 8 are the ends of a yoke 9.

Placed between the plates 3 and 4 at the other end of the device is a securing link 10. This link 10 is oblong in shape and has the ends thereof rounded and is formed with a diagonal slot 11 that opens onto one edge of the link at one end and opens into the slot 12 formed in the link, and extending toward one end thereof. The end of the link 10 remote from the slot 12 is formed with an opening 13. This end of the link is placed within the plates 3 and 4 and the opening 13 therein alines with the remaining opening 6 in the plates 3 and 4. Through these alining openings is passed a pivot pin 14. The ends of the plates 3 and 4 contiguous to the link 10 are formed respectively with alining slots 15 which register with the slot 12 in the link 10 when the link 10 is in normal or locking position, as in Figures 1 and 4 of the drawings.

One side edge of the plate 3 is formed with a flange 16 arranged at right angles to the plate, while the opposite edge of the plate 4 is formed with a flange 17. These flanges 16 and 17 extend in relatively opposite directions, as clearly shown in Figures 6 and 8 of the drawings, so as to close the major portion of the space between the plates 3 and 4.

Figure 2:
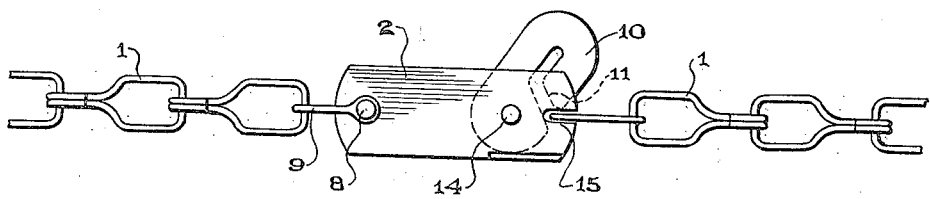
Figure 2 is a similar view showing the securing link in open position.
Figure 3:
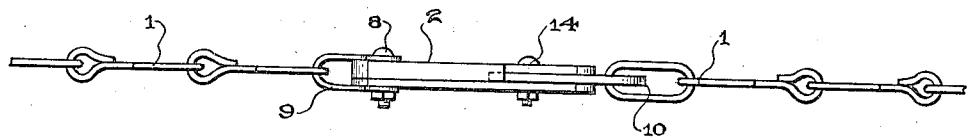
Fig. 3 is a view in edge elevation taken at right angles to Figure 1.

In practice, one end of the side chain is connected to the yoke 9, and when it is desired to connect the other end of the side chain to the fastening device, the link 10 is swung to unlocking position, as shown in Figure 2 of the drawings. In this position of the link the slots 15 are open at the outer ends, so as to receive the end link of the side chain. After the end link has been inserted in the slots 15 the securing link 10 is swung downwardly, the end link passing through the diagonal slot 11 and into the slot 12, so that as the slot 12 alines with the slots 15, the end link of the side chain may be pulled to the outer end of the slot 12, as in Figure 1 of the drawings, thereby effectively locking the ends of the side chain together.

I have entered into a detailed description of the construction and relative arrangement of parts embraced in the present and preferred embodiment of my invention with a view to imparting a full, clear and exact understanding of the said embodiment. I do not desire, however, to be understood as confining myself to the said specific construction and relative arrangement of parts, inasmuch as in the future practice of my invention such changes or modifications may be made as fairly fall within the scope of my invention as defined by my appended claims.

Having thus described the invention, what is claimed as new, is:—

1. A fastening device for the side chains of anti-skid chains comprising side plates arranged side by side, a spacing block between said plates at one end thereof, a securing link pivoted between said plates at the other end thereof, said securing link being formed with a diagonal slot opening onto one edge thereof and with a straight longitudinal slot communicating with the inner end of said diagonal slot, and said side plates at the ends in proximity to said link being formed with alining slots adapted to register with said straight slot in said link when the longitudinal axis of the plates and the link are coincident and parallel, substantially as and for the purpose described, said longitudinal slot of the link and the pivot of the latter being alined in a plane parallel with the longitudinal axis of the link.

2. A fastening device for the side chains of anti-skid chains comprising side plates arranged side by side, a spacing block between said plates at one end thereof, a securing link pivoted between said plates at the other end thereof, flanges formed on the relatively opposite side edges of said plates and closing the major portion of the space between said plates, said securing link being formed with a diagonal slot opening onto one edge thereof and with a straight longitudinal slot communicating with the inner end of said diagonal slot, and said side plates at the ends in proximity to said link being formed with alining slots adapted to register with said straight slot in said link when the longitudinal axis of the plates and the link are coincident and parallel, substantially as and for the purpose described, said longitudinal slot of the link and the pivot of the latter being alined in a plane parallel with the longitudinal axis of the link.

In testimony whereof I affix my signature.

THOMAS W. BURKETT.